E. H. SCHMIDT.
RADIAL DRAFT-GEAR.
APPLICATION FILED SEPT. 8, 1908. RENEWED JUNE 20, 1910.

975,896.

Patented Nov. 15, 1910.
5 SHEETS—SHEET 1.

WITNESSES
R. A. Balderson
W. W. Swartz

INVENTOR
E. H. Schmidt
by Bakewell, Byrnes & Parmelee,
his Attys.

E. H. SCHMIDT.
RADIAL DRAFT GEAR.
APPLICATION FILED SEPT. 8, 1908. RENEWED JUNE 20, 1910.
975,896.
Patented Nov. 15, 1910.
5 SHEETS—SHEET 2.
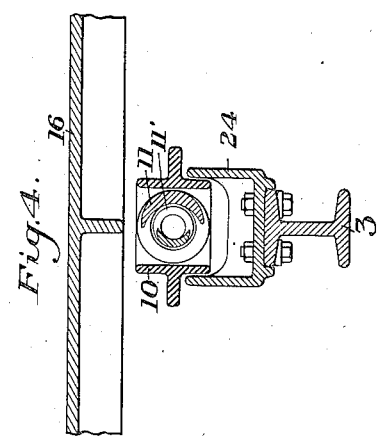
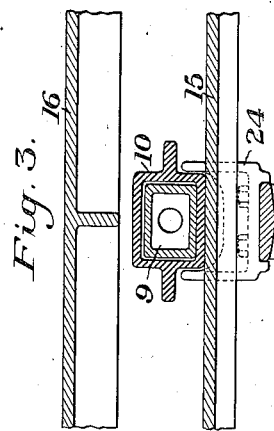
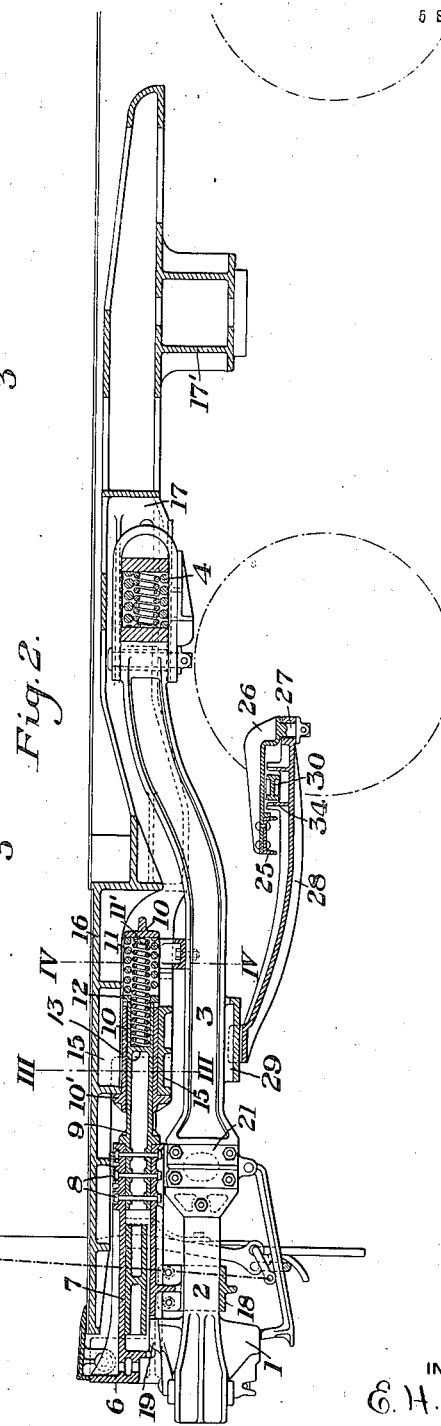
WITNESSES
R A Balderson
W W Swartz
INVENTOR
E. H. Schmidt
by Bakewell, Byrnes & Parmelee
his Attys.

E. H. SCHMIDT.
RADIAL DRAFT GEAR.
APPLICATION FILED SEPT. 8, 1908. RENEWED JUNE 20, 1910.

975,896.

Patented Nov. 15, 1910.
5 SHEETS—SHEET 3.

WITNESSES
R. A. Balderson
W. W. Swartz

INVENTOR
E. H. Schmidt,
by Bakewell, Byrnes & Parmelee,
his Attys.

E. H. SCHMIDT.
RADIAL DRAFT GEAR.
APPLICATION FILED SEPT. 8, 1908. RENEWED JUNE 20, 1910.

975,896.

Patented Nov. 15, 1910.
5 SHEETS—SHEET 4.

WITNESSES
R. A. Balderson
W. W. Swartz

INVENTOR
E. H. Schmidt,
by Bakewell, Byrnes & Parmelee,
his Attys.

E. H. SCHMIDT.
RADIAL DRAFT GEAR.
APPLICATION FILED SEPT. 8, 1908. RENEWED JUNE 20, 1910.
975,896.
Patented Nov. 15, 1910.
5 SHEETS—SHEET 5.
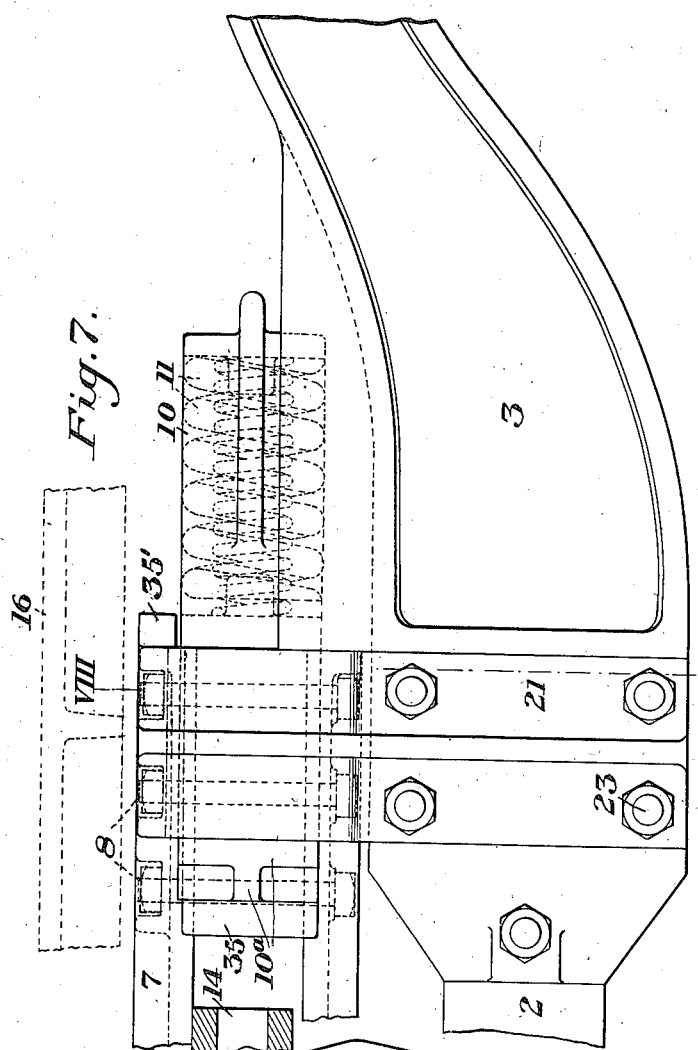
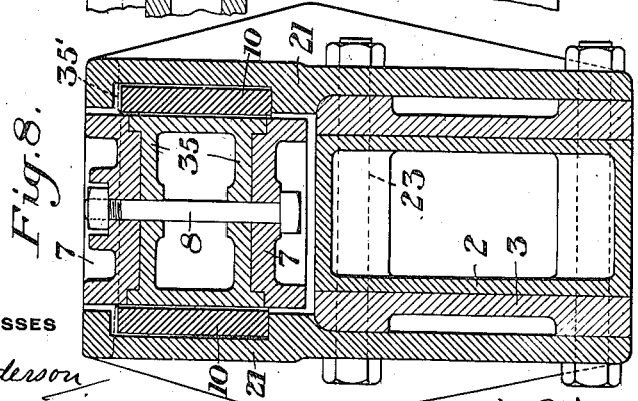

UNITED STATES PATENT OFFICE.

ERNEST H. SCHMIDT, OF CLEVELAND, OHIO, ASSIGNOR TO THE NATIONAL MALLEABLE CASTINGS COMPANY, OF CLEVELAND, OHIO, A CORPORATION OF OHIO.

RADIAL-DRAFT GEAR.

975,896.

Specification of Letters Patent. Patented Nov. 15, 1910.

Application filed September 8, 1908, Serial No. 451,975. Renewed June 20, 1910. Serial No. 567,998.

*To all whom it may concern:*

Be it known that I, ERNEST H. SCHMIDT, of Cleveland, in the county of Cuyahoga and State of Ohio, have invented a new and useful Improvement in Radial-Draft Gears, of which the following is a full, clear, and exact description, reference being had to the accompanying drawings, forming part of this specification, in which—

Figure 1:
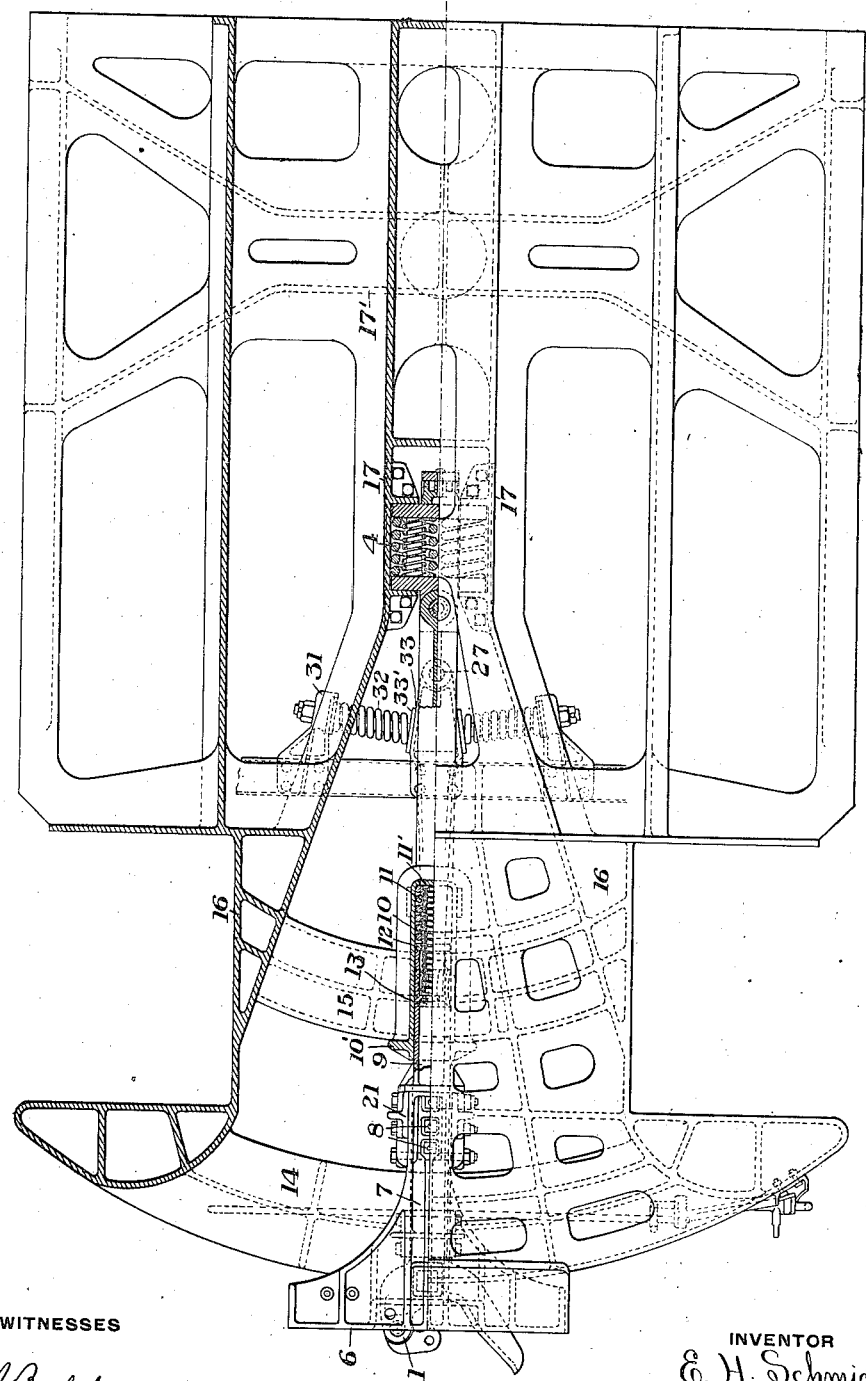
Figure 5:
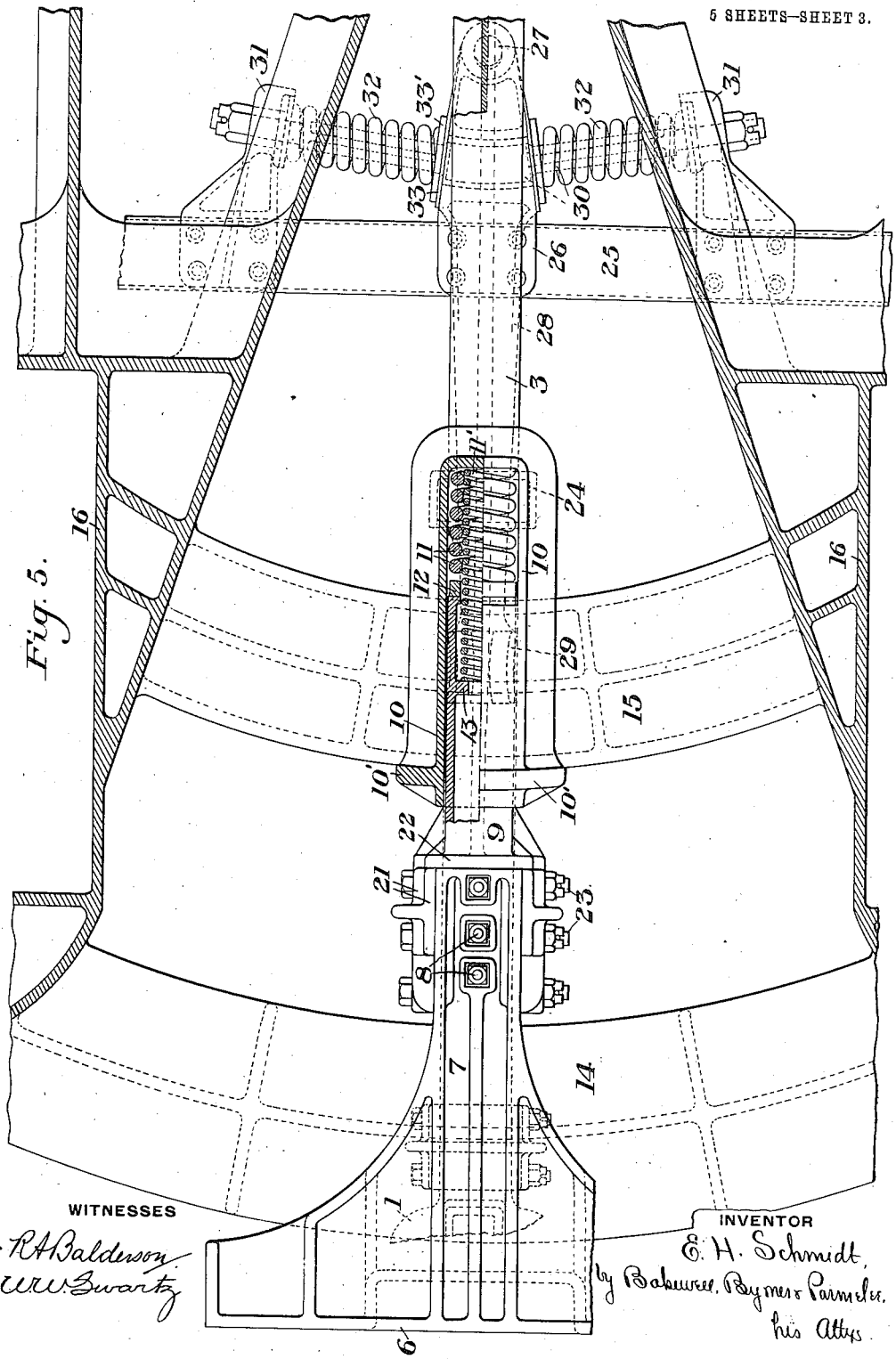
Figure 6:
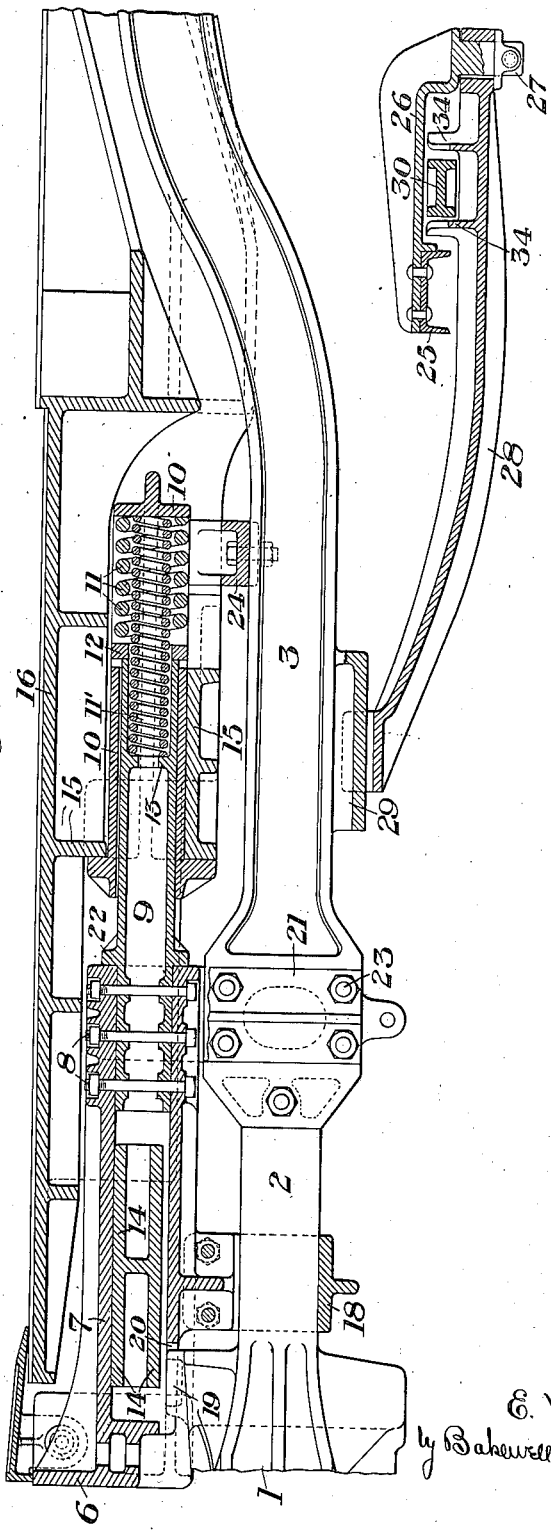

Figure 1 is a plan view partly in section showing the preferred form of my invention; Fig. 2 is a longitudinal section of the parts shown in Fig. 1; Figs. 3 and 4 are sections on the lines III—III and IV—IV respectively of Fig. 2. Fig. 5 is a partial sectional plan view on a larger scale; Fig. 6 is a longitudinal section of Fig. 5; Fig. 7 is a detail view showing a modification; and Fig. 8 is a cross section on the line VIII—VIII of Fig. 7.

In the drawings, 1 is the coupler head having a shank 2, affixed to a rear extension 3 which is extended to and is pivotally connected with the draft rigging 4, the draft rigging being mounted between the car sills so as to be adapted for longitudinal motion in buffing and draft, but being held from lateral swinging motion with the coupler.

6 is the transverse member of the buffer, having a shank 7, which is divided or forked longitudinally and is attached by vertical bolts 8 to a buffer shank extension 9, which extends rearwardly in line with the buffer shank.

10 is the buffer yoke, preferably made in the form of a casting which, at its forward portion, as shown in section in Figs. 1 and 5, is preferably of a box shape and at its rear portion is of loop or U-shape having side arms only. The yoke is fitted around the buffer shank extension 9 and projects rearwardly therefrom and in line therewith so as to contain within its arms the buffer spring, which preferably consists of outer and inner coils 11, 11'.

12 is a follower which abuts against the end of the buffer shank extension 9. The inner coil 11' extends through the follower 12, which is made annular for that purpose, and abuts against a stop 13 in the interior of the buffer shank extension, the outer coil 11 abutting against the follower 12.

14 is the end sill of the platform which acts as a carry-iron for the buffer, passing for this purpose between the arms of its shank 7 and being curved or segmental in form so as to present a forward curved buffing face for the transverse member 6 of the buffer when it reaches the rear limit of its buffing motion. The buffing strains are normally transmitted to a divided segment 15, the members of which are parallel and separated by an intermediate space through which the buffer shank extension and the yoke pass. These members of the divided segment are preferably made integral with a platform casting 16, which constitutes a part of the platform of the car. The parts 14 and 15 may be integral with one another and with cheek-plates 17, and bolster 17', making an integral casting of the bolster and all the parts of the car-frame in front of the bolster.

The yoke 10 has at its front end a flanged or enlarged head 10', which fits against the curved face of the divided segment 15 and is adapted to move along the same during the radial motion of the buffer. The coupler is supported from the buffer by a hanger 18 and is also engaged with the buffer, preferably at a number of points. The front engagement, shown in the drawing, consists of an upwardly projecting lug 19 on the coupler head, which fits within a longitudinal open slot 20 on the under side of the buffer shank. Back of the hanger 18 the coupler shank is also preferably provided with vertically extending plates 21, which are fixed to the opposite sides of the coupler shank and extend upwardly beside the buffer shank, with which they are engaged by means of shoulders 22 on the buffer shank extension. These plates are fixed to the coupler shank by bolts 23. The buffer is also preferably engaged with the coupler by a forked piece 24, attached to the coupler shank extension and extending upwardly on each side of the buffer yoke 10.

When buffing stresses are received by the transverse member 6 of the buffer, they are transmitted through its shank 7 and the shank extension 9 to the follower 12 and stop 13, which transmit the stresses rearwardly to the springs 11, 11'. These springs are held from rearward movement by the yoke 10, which in turn is held by engagement of its front end 10' with the divided segment 15, so that the spring is compressed and resists yieldingly the rearward motion of the buffer and its shank.

Where buffing force is applied to the coupler, the coupler moves rearwardly against the draft springs, and its rearward motion is also transmitted by the plates 21 to the rear shoulders 22 of the buffer-shank extension, and it moves the latter rearwardly and likewise compresses the buffer springs 11 and 11' within the yoke. When the coupler is pulled forward, it compresses its draft springs in the usual manner, and the forward motion of its side plates 21, relieving the rear pressure on the shoulders 22 will permit the buffer to be moved forward by the spring 11', which for this purpose is set in place under initial compression.

The forward face of the divided segment 15 is an arc whose center is the pivotal center of the coupler shank extension, and as the forward end of the yoke 10 is constructed to fit this segment, it will swing laterally thereon with the coupler as the car travels over curves.

By reason of the several points of engagement of the buffer with the coupler, the buffer and coupler will swing laterally together, but as above explained, the coupler is capable of forward motion independently of the buffer and during such forward motion the buffer follows the same by reason of the expansive action of its spring. By connecting the coupler to the truck with guiding connections, shown in Figs. 1 and 5, the coupler and buffer are guided radially to the approximate center of the car track at all times and are thus maintained in proper position for coupling.

The guiding connection which I prefer to use is shown in Figs. 5 and 6, and is constructed as follows: 25 is the forward member of the truck frame and 26 is a bracket extending rearwardly therefrom and carrying a pivot pin 27, for the member 25 is too far forward to be a suitable location for the pivot. An arm 28, pivoted on the pin 27, extends forwardly into sliding engagement with a guide-way 29, on the under side of the coupler shank extension.

30 is a transverse rod which is connected at its ends to brackets 31, and 32 are springs bearing at their ends upon the brackets 31, shoulders 33 and followers 33' on the rod 30. The rod 30 passes between the bracket 31 and the arm 28, and is inclosed laterally between projections 34 on the arm and when in central position and not acting upon the springs, the arm 28 lies between the shoulders 33; but if the coupler is deflected to one side or the other relatively to the truck, it compresses one of the springs which, when the deflecting pressure is released, restores the coupler into normal position. By having the springs bear normally on the shoulders and not on the arm 28, any inequality of adjusted compression of the springs will not affect the normal central position of the arm.

It will be seen from the foregoing description that the place of resistance which takes up the buffing stresses applied to the buffer is at a point forward of the rear end of the buffer-spring, and therfore, near to the transverse buffer member, so that the buffer shank proper (that is to say, the portion of the buffer between the point of transmission of the buffing stresses to the car frame or draft gear and the transverse member of the buffer at which the buffing stresses are received) is short. This is an advantage, because it strengthens the construction of the buffer and enables radial buffers to be applied with convenience to car constructions to which they would otherwise be applicable only with difficulty.

My invention, by transmitting the buffing stresses to the car frame in advance of the buffer springs enables me to use my device in car constructions where the end sill of the car frame is so far forward or drops down so low that it would not be feasible to cause the end of the buffer back of the springs to bear against a curved segment.

In Figs. 7 and 8, I show a modification of my invention in which the buffing segment 15 is dispensed with and the forward shoulders 10ª of the yoke 10 are made to abut against the front face of the plates 21 so that the stresses of buffing are communicated from the buffer through the yoke and the plates 21 to the coupler shank extensions 3. A filler block 35 between the rear ends of the divided buffer shank serves to transmit the buffing blows to the springs 11, 11', and this filler block has laterally extending lugs 35' which fit against the rear of the plates 21 and prevent the withdrawal of the buffer. They also furnish an abutment which enables the buffer springs 11, 11' to be initially compressed. If desired, the plates 21 may be integral with the coupler shank extension.

I claim:

1. A radially swinging buffer having a shank and transverse member rigid with one another, with buffing-spring mechanism having its place of bearing in advance of the rear of the spring.

2. A radially swinging buffer, a radially swinging draft gear, and buffer springs bearing against a member which has a sliding bearing upon the car frame at a point in advance of the rear of the spring, the transverse member of the buffer being rigid with its shank.

3. A radially swinging draft gear, a radially swinging buffer mounted above the draft gear and engaged so as to swing laterally therewith, said buffer having a transverse member and rigid shank, and a spring carrier bearing against a curved portion of the car frame in advance of the rear of the spring.

4. A radially swinging draft gear, a radially swinging buffer mounted above the draft gear and engaged so as to swing laterally therewith, said buffer having a laterally moving spring carrier bearing against the car frame at a place back of the end sill of the car platform and in advance of the rear of the spring.

5. A radially swinging draft gear, a radially swinging buffer mounted above the draft gear and engaged so as to swing laterally therewith, said buffer having a spring, a yoke into which the buffer extends, said yoke having a bearing back of the end sill of the platform and in advance of the rear of the spring.

6. A radially swinging buffer having a yoke carrying a spring, and a buffer shank extending within the yoke and adapted to compress the spring.

7. A radially swinging buffer having a yoke carrying a spring, and a buffer shank extending within the yoke and adapted to compress the spring, said yoke having a sliding bearing on the car frame.

8. A radially swinging buffer having a member whose bearing is in advance of the rear of the buffer spring adapted to transmit the buffing stress, and a second rigid member which passes through the first mentioned member and applies the buffing stress to the spring.

9. A radially swinging buffer having a bearing member whose point of transmission of the buffing stress is at its forward end and which at its rear end carries a spring, said buffer having a longitudinally movable rigid member bearing against the spring.

In testimony whereof, I have hereunto set my hand.

ERNEST H. SCHMIDT.

Witnesses:
HENRY F. POPE,
HARRY T. KRAKAU.